June 19, 1934.  H. C. EDDY ET AL  1,963,325
DEHYDRATOR HAVING EMULSION GUIDING SURFACE
Filed Dec. 21, 1931  2 Sheets-Sheet 1
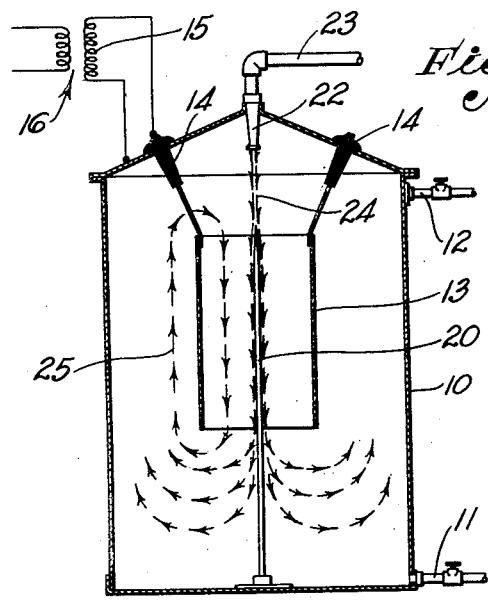
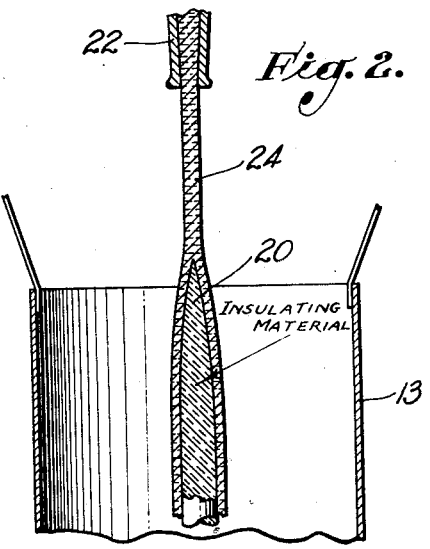
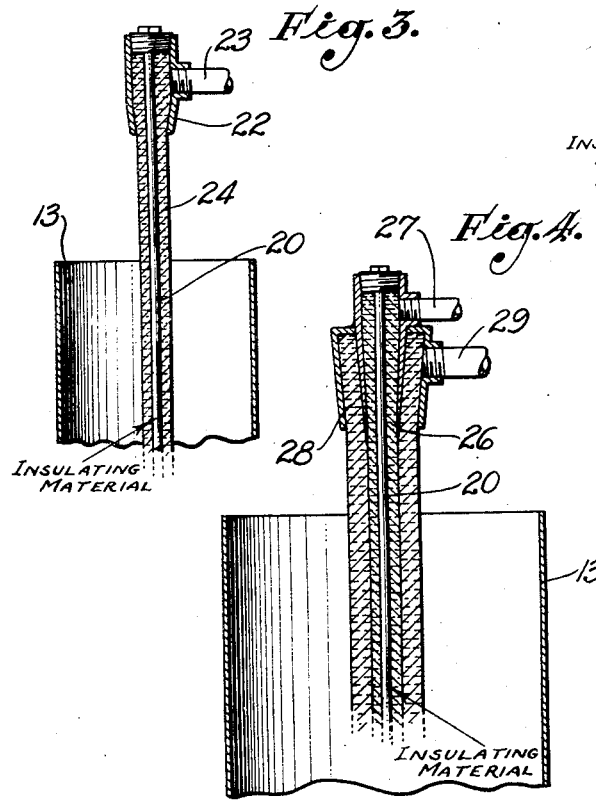
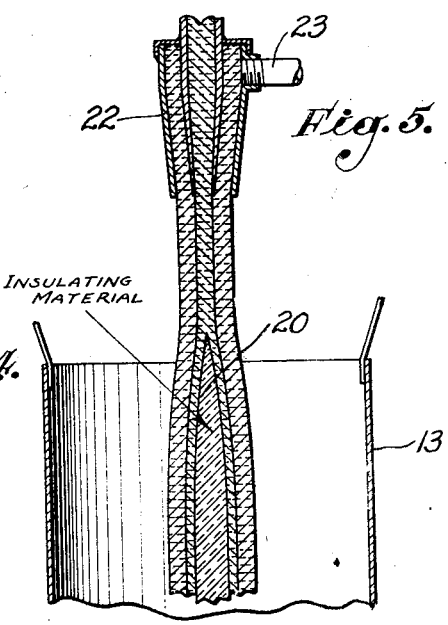
INVENTORS:
Harold C. Eddy,
Clarence F. Kiech,
BY
ATTORNEY.

INVENTORS:
Harold C. Eddy,
Clarence F. Kiech,
BY

ATTORNEY.

Patented June 19, 1934

1,963,325

UNITED STATES PATENT OFFICE 1,963,325

DEHYDRATOR HAVING EMULSION GUIDING SURFACE

Harold C. Eddy and Clarence F. Kiech, Los Angeles, Calif., assignors to Petroleum Rectifying Company of California, Los Angeles, Calif., a corporation of California Application December 21, 1931, Serial No. 582,283

9 Claims. (Cl. 204—24)

This invention relates to electric treaters, and more particularly to an electric treater which finds particular utility in the dehydration of petroleum emulsions.

The conventional manner of electrically dehydrating an emulsion is to move this emulsion between metallic electrodes and through an electric field which is set up therebetween. This field effects the agglomeration of the dispersed particles or droplets so that subsequent gravitational separation of the phases of the emulsion is made possible. Best results are usually obtained if the electric field is highly concentrated adjacent one of the electrodes, but it has been found that when certain emulsions are thus treated a scale is formed on the electrode adjacent which the field is most intense, thus requiring periodic inspection and cleaning.

A co-pending application of Harold C. Eddy, Serial No. 234,810, Patent No. 1,838,915, of which the present application is an improvement, discloses a system of using a stream of liquid as an electrode, thereby eliminating this scaling action. That application also discloses a system in which the incoming emulsion itself contains sufficient conducting material to act as an electrode while undergoing treatment. In either case, the liquid is forced axially through a horizontally disposed sleeve electrode at sufficient velocity to carry the stream entirely through the sleeve electrode. This system requires the use of a relatively high pressure, for the horizontal flowing stream of emulsion should preferably remain in the exact center of the sleeve for best results, and in any event must not be allowed to droop to such an extent that it comes in contact with the sleeve, for this would result in a short-circuit of the apparatus.

It is an object of the present invention to provide a method and apparatus effecting the desirable results of scale elimination, etc., and which eliminates the necessity of a high-pressure system, this being accomplished by the use of a very simple and easily constructed apparatus. These improved results are made possible by utilizing the inherent difference in density between the incoming emulsion and one of the separated phases to set up a channelling action which guides the emulsion through a predetermined path.

In the co-pending application of H. C. Eddy, supra, the stream of emulsion or conducting liquid flows in spaced relationship with any supporting surface after it leaves the nozzle.

It is an object of the present invention to provide a method and apparatus in which the stream is guided by flowing along the surface of a member formed of an insulating material so that while this member is not used for setting up the electric field, it nevertheless serves to guide the stream of liquid as this liquid flows therealong.

Further objects of the invention lie in the constructional details of the form of the invention herein described, while still further objects of the invention will be apparent to those skilled in the art from the following description of certain forms of our invention.

In the drawings,—

Fig. 1 is a sectional view of one form of dehydrator.

Fig. 2 is an enlarged diagrammatic view of the electrode system shown in Fig. 1.

Figs. 3, 4, and 5 diagrammatically illustrate other electrode systems.

Figure 6:
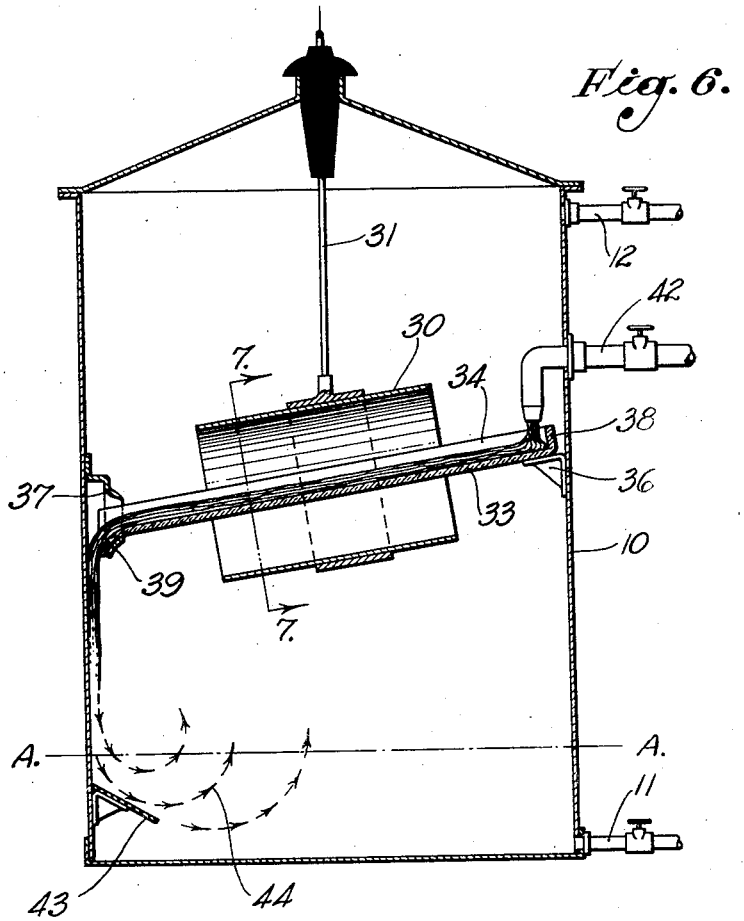

Fig. 6 is a sectional view of still another form of the invention.

Figure 7:
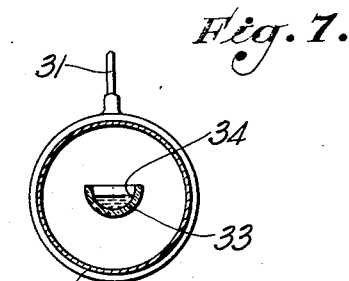

Fig. 7 is a view taken on the line 7—7 of Fig. 6.

The treater shown in Fig. 1 includes a tank 10 of conventional design and provided with draw-off pipes 11 and 12. The invention will be described in detail with reference to the treatment of a petroleum emulsion of oil and water, in which case the pipes 11 and 12 respectively conduct water and oil from the tank 10.

A live sleeve electrode 13 is supported axially in the tank 10 by means of insulators 14 and is electrically connected to one terminal of the secondary 15 of a transformer 16 in the usual manner, the other terminal of this secondary being connected to the tank 10 and to ground.

Supported to extend axially through the sleeve electrode 13 is a member 20 in the form of a pointed rod, this member being formed of an insulating material such as "bakelite", hard rubber, or other insulating medium.

Spaced above the rod 20 and axially aligned therewith is a directing means in the form of a nozzle 22 electrically connected to the tank 10 and depending from the apex thereof. When utilizing this form of the invention it is necessary that the liquid which is delivered to nozzle 22 be a relatively good conductor of electricity. This liquid is delivered to the nozzle 22 through a pipe 23 at a pressure which need be only very slightly higher than the pressure in the tank 10. The conducting liquid moves downward through the nozzle 22 in the form of a smooth-flowing stream 24, best illustrated in Fig. 2. This stream is pierced by the pointed end of the rod 20 so as to form an envelope moving downward around the rod 20. The stream 24 moves downward in the tank 10 due to gravitational forces, and it is neither necessary nor desirable that this stream be of high velocity. The high velocity discharge of such a stream into a body of liquid around the nozzle inevitably sets up some slight turbulence which tends to spread the stream. If, however, the stream 24 is allowed to gravitate through the body of surrounding liquid, a channelling action will take place which not only results in the stream moving vertically downward so as to be in exact alignment with the rod 20 when it comes in contact therewith, but also effects no turbulence and thus no intermixture between the incoming stream and the liquid into which the stream moves.

Two methods of operation of the apparatus shown in Fig. 1 are possible. If the treater is to be used as a batch treater, the tank 10 will be filled with the emulsion to be treated and the liquid forming the stream 24 will comprise water or other conducting liquid. This conducting liquid, of course, flows in contact with the nozzle 22 and is thereby maintained at ground potential, and thus cooperates with the sleeve 13 in setting up an electric field. Due to the guiding action of the rod 20, the conducting liquid does not spread from the surface of this rod while passing through the electric field and no short-circuiting tendency is present. The electric field, thus tends to treat the emulsion inside the sleeve electrode 13. Several factors tend to circulate the remaining emulsion in the tank through the electric field, as indicated by the arrows 25, such, for instance, as the agglomerated water particles settling from the field, and the slight injector action of the stream 24 moving downward in the sleeve 13. This circulation may be increased by maintaining the temperature of the liquid forming the stream 24 lower than the temperature of the surrounding emulsion whereby a thermal circulating effect is obtained. Eventually all of this emulsion will have been moved through the electric field one or more times and the dispersed particles thereof will agglomerate and drop to the lower end of the tank whence they are removed through the pipe 11. The oil phase of the emulsion will move to the upper end of the tank.

In the event that the treater 10 is to be used in effecting a continuous dehydration, the emulsion to be treated is moved through the nozzle 22 and is of such a character that the emulsion itself will form the liquid electrode. Some emulsions already have sufficient conductivity to effect this end, while other emulsions having a smaller water content should be so treated as to increase their conductivity, as, for instance, by adding water or an electrolyte thereto prior to the time that the emulsion moves through the pipe 23. This emulsion not only forms the liquid electrode moving downward through the sleeve 13, but in so doing is treated by the electric field.

It will be understood that no treatment takes place between the nozzle 22 and the rod 20, in view of the fact that this rod is formed of insulating material. Nor does any treatment take place between the rod itself and the sleeve electrode 13. The rod is not positioned in the electric field but is instead in a substantially equipotential space inside the envelope of conducting liquid which forms the electrode so that the rod merely serves to guide the emulsion or conducting liquid as it moves through the sleeve electrode.

In some instances, it is possible to dispense with the rod 20, allowing the channelling action of the incoming stream of liquid to carry this stream entirely through the sleeve electrode 13 due to the fact that the density of this incoming liquid is greater than the density of the liquid into which it is introduced.

Another form of electrode system is shown in Fig. 3 in which the insulated rod 20 extends upward into the nozzle 22. This eliminates the necessity of a pointed rod and allows the rod to serve as a guide means for the incoming liquid during the whole of its vertical movement in the tank 10.

In Fig. 4, we have disclosed a nozzle providing concentric passages, the inner passage being indicated by the numeral 26 and communicating with the pipe 27 which supplies water or other conducting liquid to the space immediately around the rod 20, the outer passage being indicated by the numeral 28 and being supplied through the pipe 29 with the emulsion to be treated. The nozzle thus discharges concentric streams of conducting liquid and emulsion, both of which are guided by the rod 20. The inner stream of conducting material thus acts as an electrode, the electric field being set up between this stream and the sleeve electrode 13 so as to treat the envelope of emulsion moving downward around the stream of conducting liquid.

The form of the invention shown in Fig. 5 is quite similar to Fig. 4, differing only in that the rod 20 does not extend into the passage 26 of the nozzle, being similar to the electrode system of Figs. 1 and 2 in this regard. When this system is utilized the concentric streams of conducting liquid and emulsion move downward from the nozzle and are pierced by the pointed rod 20 in the manner previously described.

The form of the invention shown in Fig. 6 includes a sleeve electrode 30 supported on a rod 31 and held in such a position that its axis is slightly inclined. Extending through this sleeve electrode is a trough 33 formed of insulating material and providing a fluid-conducting channel 34. This trough may be supported in any desired manner, such, for instance, as by brackets 36 and 37, which support the trough in such a position that it extends substantially axially through the sleeve electrode 30. The higher end of the fluid conducting channel 34 is closed by an end wall 38, while the lower end provides a spout 39 discharging adjacent the inner wall of the tank 10. The emulsion to be treated is delivered to the upper end of the fluid-conducting channel 34 by a pipe 42 which is grounded to the tank 10. The incoming emulsion flows downward in the fluid-conducting channel 34 and through the sleeve electrode 30, being discharged into contact with the wall of the tank 10 and moving downward in this tank to be deflected by an inclined baffle 43 which deflects this downward flow as indicated by the arrows 44.

When this form of the invention is first set into operation, it is preferable to fill the tank 10 with dry oil though this is not in all cases necessary. After a period of operation the water separated from the emulsion accumulates in the bottom of the tank below a level A—A, the liquid above this level being dry oil. The incoming emulsion is of such a character as to be a relatively good conductor of electricity, thus itself forming the central electrode as it moves through the sleeve 30, the trough 33 guiding this emulsion during this movement and insuring that the emulsion will remain in the exact center of the sleeve 30. The water phase of the emulsion is thus agglomerated and as this treated emulsion moves downward along the inner wall of the tank 10 it moves below the water level A—A and is deflected by a baffle 43, as shown, so that the agglomerated water particles tend to be washed from the oil, the dry oil rising to the upper end of the tank from which it may be withdrawn through the pipe 12. No short-circuiting of the electrodes will take place in view of the fact that the wet emulsion does not bridge between the sleeve electrode 30 and any grounded member of the apparatus.

Due to the fact that no metallic central electrode is utilized no trouble will be experienced with scaling in any of the forms of the invention. Scaling of the trough 33 or rods 30 will not take place due to the fact that these members do not comprise electrodes but are formed of insulating material. The utility of these members in guiding the conducting liquid or emulsion through the sleeve electrode is, however, an important part of the invention. So also in the form of the invention shown in Figs. 1 to 5, it is a very desirable feature to direct the emulsion vertically so that a desirable channelling action takes place which insures movement of the emulsion or conducting liquid through the desired path of travel regardless of the presence of the central rod. If the incoming conducting fluid at any time becomes sufficiently non-conducting to render the process inoperative, separated conducting fluid from below the level A—A may be picked up by a pump and mixed with the fluid to be treated entering through the pipe 42 or pipe 23 in Fig. 1.

We claim as our invention:

1. In an electric treater, the combination of: a guide member formed of an insulating material; means for flowing a stream of conducting liquid along the outer surface of said guide member in the form of an envelope, said stream of conducting liquid forming a liquid electrode; and means including an electrode around said liquid electrode for setting up an electric field around said liquid electrode.

2. In an electric treater for treating a petroleum emulsion, the combination of: a sleeve electrode; means flowing an annular stream of conducting liquid axially through said sleeve electrode to form a liquid electrode whereby the central portion of said annular stream forms an equipotential space, said means including a rod formed of insulating material and positioned in said equipotential space to guide said annular stream; and means for establishing a potential difference between said sleeve electrode and said liquid electrode.

3. In an electric treater for treating a petroleum emulsion, the combination of: a sleeve electrode; a rod formed of insulating material and extending axially in said sleeve electrode; directing means for flowing an annular stream of liquid conducting material along and in enveloping relation with said rod; means for flowing an annular stream of the emulsion to be treated between said conducting material and said sleeve electrode; and means for establishing a potential difference between said directing means and said sleeve electrode whereby said annular stream of liquid conducting material forms an electrode cooperating with said sleeve electrode to define an electric field treating said emulsion.

4. In an electric treater, the combination of: an electrode formed of a conducting material; means for directing a smooth flowing stream of a conducting liquid in spaced relationship with said electrode to form a liquid electrode; potential supply means for establishing an electric field between said electrode and said liquid electrode; and a body formed of insulating material positioned in the path of travel of said liquid forming said liquid electrode for guiding said liquid electrode as it flows therealong and positioned out of said electric field between said electrodes whereby said body acts only as a guide and not as an electrode.

5. In an electric treater for treating an emulsion, the combination of: a guide member in the form of a trough and formed of an insulating material; delivery means for flowing a stream of emulsion along said trough and having a large enough percentage of conducting material to form a liquid electrode; a sleeve electrode around said trough; and means for establishing a potential difference between said delivery means and said sleeve electrode.

6. A method of electrically treating an emulsion having relatively good conducting properties by the use of a guide formed of insulating material, which method includes the steps of: forming a stream of said emulsion; flowing said stream of said emulsion along and in contact with the surface of said guide whereby said emulsion flows in contact with an insulating material; and building up an electric field extending from said stream of emulsion flowing along said guide and in a direction away from said guide whereby the electric flux of said field does not pass through said insulating material, said emulsion in said stream having sufficient conductivity to itself act as a liquid electrode.

7. In an electric treater for treating an emulsion, the combination of: a tank; a guide member in the form of a trough formed of insulating material and extending transversely of said tank and discharging a stream of treated emulsion adjacent the inner wall of said tank; means for delivering emulsion to said trough; and means for electrically treating said emulsion as it flows along said trough to agglomerate the dispersed phase thereof.

8. In an electric treater for treating an emulsion, the combination of: a guide member in the form of an inclined trough formed of insulating material; means for introducing emulsion into an elevated portion of said trough whereby said emulsion flows therealong by gravity and is discharged from a lower portion thereof; means for electrically treating said emulsion during the time it is flowing along said trough to agglomerate the dispersed phase of said emulsion; and means for separating said agglomerated dispersed phase from the remainder of the emulsion.

9. A method of electrically treating an emulsion, which method includes the steps of: discharging a smooth-flowing solid stream of emulsion vertically downward through a body of liquid of less density than the density of said emulsion said emulsion containing sufficient conducting material to act as an electrode; piercing said solid stream after it has been discharged to form said stream into an annular shape providing an equipotential space thereinside; establishing an intense electric field around only the annular portion of said stream by utilizing the annular stream itself as one electrode, one phase of the emulsion being coalesced by said field; and separating said phase from the remaining phase of said emulsion.

HAROLD C. EDDY.
CLARENCE F. KIECH.